(12) United States Patent
Wu et al.

(10) Patent No.: US 9,998,746 B2
(45) Date of Patent: Jun. 12, 2018

(54) VIDEO DECODER MEMORY OPTIMIZATION

(71) Applicant: Amazon Technologies, Inc., Seattle, WA (US)

(72) Inventors: Yongjun Wu, Bellevue, WA (US); Charles Benjamin Franklin Waggoner, Portland, OR (US); Amarsingh Buckthasingh Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 15/040,602

(22) Filed: Feb. 10, 2016

(65) Prior Publication Data

US 2017/0230677 A1    Aug. 10, 2017

(51) Int. Cl.
| | |
|---|---|
| *H04N 5/92* | (2006.01) |
| *H04N 19/44* | (2014.01) |
| *H04N 19/426* | (2014.01) |
| *H04N 19/48* | (2014.01) |
| *H04N 19/625* | (2014.01) |
| *H04N 19/124* | (2014.01) |
| *H04N 19/136* | (2014.01) |
| *H04N 19/46* | (2014.01) |
| *H04N 19/176* | (2014.01) |
| *H04N 19/134* | (2014.01) |
| *H04N 19/122* | (2014.01) |

(Continued)

(52) U.S. Cl.
CPC .......... *H04N 19/44* (2014.11); *H04N 19/122* (2014.11); *H04N 19/124* (2014.11); *H04N 19/134* (2014.11); *H04N 19/136* (2014.11); *H04N 19/176* (2014.11); *H04N 19/18* (2014.11); *H04N 19/42* (2014.11); *H04N 19/426* (2014.11); *H04N 19/46* (2014.11); *H04N 19/48* (2014.11); *H04N 19/61* (2014.11); *H04N 19/625* (2014.11); *H04N 19/45* (2014.11)

(58) Field of Classification Search
CPC .............................. H04N 5/92; H04N 5/9264
USPC ..................................... 375/240.18
See application file for complete search history.

(56) References Cited

U.S. PATENT DOCUMENTS

| | | | | |
|---|---|---|---|---|
| 7,656,949 B1* | 2/2010 | Zhang | ................. | H04N 19/122 375/240.02 |
| 2012/0163470 A1* | 6/2012 | Wu | ...................... | H04N 19/176 375/240.23 |
| 2013/0336385 A1* | 12/2013 | Budagavi | ............ | H04N 19/176 375/240.2 |

FOREIGN PATENT DOCUMENTS

| | | |
|---|---|---|
| EP | 2624561 | 8/2013 |
| WO | WO 2015/183375 | 12/2015 |

OTHER PUBLICATIONS

PCT International Search Report and Written Opinion dated Apr. 11, 2017 issued in PCT/US2017/015656.

(Continued)

*Primary Examiner* — Jamie Atala
*Assistant Examiner* — Kathleen Nguyen
(74) *Attorney, Agent, or Firm* — Weaver Austin Villeneuve & Sampson LLP

(57) ABSTRACT

Techniques are described for optimizing memory used by a video decoder. A residual coefficient matrix including non-zero value residual coefficients of a larger parent matrix with both non-zero and zero value residual coefficients can be provided to the decoder. Residual coefficient matrix meta- (Continued)

data can also be provided so that a modified and reduced inverse transform matrix can be selected and applied to the residual coefficient matrix.

20 Claims, 6 Drawing Sheets

(51) Int. Cl.
*H04N 19/61* (2014.01)
*H04N 19/18* (2014.01)
*H04N 19/42* (2014.01)

(56) References Cited

OTHER PUBLICATIONS

Budagavi, Madhukar, "IDCT pruning" *Joint Collaborative Team on Video Coding (JCT-VC) of ITU-T SG16 WP3 and ISO/IEC JTC1/SC29/WG11*, 5th Meeting: Geneva, CH, Mar. 16-23, 2011.

Budagavi, Madhukar, "IDCT pruning and scan dependent transfom1 order" *Joint Collaborative Team on Video Coding (JCT-VC) of ITU-T SG16 WP3 and ISO/IEC JTC1/SC29/WG11 6th Meeting: Torino, IT*, Jul. 14-22, 2011.

Chen, et al., "Low-Complexity Inverse Transforms of Video Codecs in an Embedded Programmable Platform" *IEEE Transactions on Multimedia* 13(5):905-921, 2011.

Hong et al., "Low-complexity 16×16 and 32×32 transfotras and partial frequency transform" *Joint Collaborative Team on Video Coding (JCT-VC) of ITU-T SG16 WP3 and ISO/IEC JTC1/SC29/WG11 3rd Meeting: Guangzhou, CN*, Oct. 7-15, 2010.

\* cited by examiner

VIDEO DECODER MEMORY OPTIMIZATION

BACKGROUND

Consumers have an ever-increasing array of options for consuming media content, in terms of the types of media content (e.g., video, audio, text, etc.), providers of the media content, and devices for consuming media content. Media content providers are becoming increasingly sophisticated and effective at providing media content quickly and reliably to consumers.

Media content (e.g., movies, television shows, videos, etc.) can be encoded, which includes using compression algorithms to reduce the number of bits needed to transmit the media content to a viewer's device. A viewer's device can decode the media content for playback. Decoding the media content includes algorithms applying a variety of transforms to reconstruct the media content. Unfortunately, decoding the media content can use a large amount of memory resources of the viewer's device.

DETAILED DESCRIPTION

Figure 1:
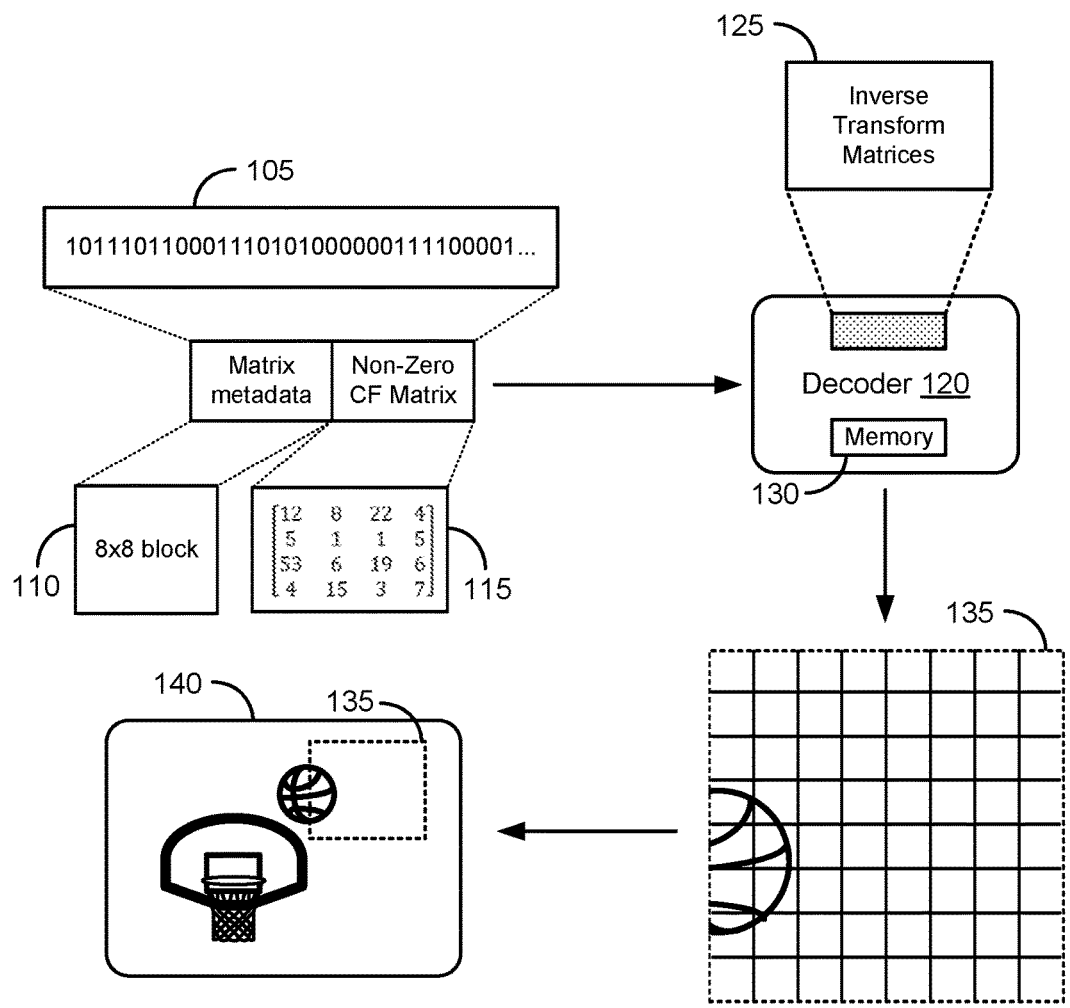
FIG. 1 illustrates an example of decoding media content with a reduced residual coefficient matrix for playback.

This disclosure describes media content encoding and decoding techniques that can use less memory of a viewer's device. For example, media content (e.g., movies, television shows, videos, audio, etc.) can be encoded, resulting in a compressed bitstream representing a version of that media content. The encoding process can include determining residual coefficients representing differences in image content between a portion (e.g., an M×N block of pixels) of a target frame being encoded and corresponding portions of reference frames.

The residual coefficients can be expressed in a residual coefficient matrix corresponding to the size of the portion. The residual coefficients can be expressed in the frequency domain by applying a Discrete Cosine Transform (DCT) to the residual coefficient matrix in the spatial domain. Following a quantization step to scale down the residual coefficients in the frequency domain as a form of compression, many of the residual coefficients of the matrix end up being zeros and a small number of the residual coefficients being non-zero values. The non-zero residual coefficients represent the kept differences after compression in the image content between the portion of the target frame and the corresponding portions of the reference frames and can be used to recreate the portion of the target frame at a decoder.

By contrast, the zero coefficients are relatively meaningless (in an encoding scheme utilizing residuals) and could be removed or reduced in a compression scheme.

The encoder can select the non-zero coefficient portion of the frequency domain residual coefficient matrix by quantization and package it within a bitstream with syntax bits as metadata indicating the size of the full matrix (i.e., with both the non-zero and zero coefficients) from which the non-zero coefficient portion was selected from. For example, if the residual coefficient matrix in the frequency domain is an 8×8 matrix but all of the non-zero coefficients are in the top-left 4×4 portion or subset of the 8×8 matrix, then the coefficients within the 4×4 portion can be selected as a 4×4 non-zero residual coefficient matrix representing the residual coefficients needed to reconstruct the portion of the target frame corresponding to an 8×8 portion. That is, the 4×4 matrix provides the residual coefficients needed to reconstruct the portion of an image frame corresponding to the larger, full 8×8 matrix (e.g., representing an 8 pixel by 8 pixel block) without any loss.

Thus, a viewer's device can receive the bitstream with the encoded representation of the media content and decode the bitstream to reconstruct the media content for playback. For example, a decoder can select the non-zero residual coefficient matrix from the bitstream and determine its size. The decoder can then select an inverse transform matrix to be applied to the non-zero residual coefficient matrix based on the size of the non-zero residual coefficient matrix and the size of the full matrix from which it is a subset. For example, the decoder can store a variety of inverse transform matrices to be used for different combinations of sizes of non-zero residual coefficient matrices and sizes of the full residual coefficient matrices. In the prior example, the decoder can determine that a 4×4 non-zero residual coefficient matrix from a full 8×8 residual coefficient matrix has been received and can apply a 4×4 inverse transform matrix that is a smaller portion of an 8×8 inverse transform matrix. As a result, the decoder can reconstruct the portion of a frame of the media content corresponding to the full 8×8 residual coefficient matrix with the smaller 4×4 non-zero residual coefficient matrix for playback.

As discussed later herein, providing the decoder with the non-zero residual coefficients can result in using less memory resources (e.g., random access memory (RAM)) of the viewer's device to decode the encoded media content. This can allow for older devices, cheaper devices with low memory, or other applications needing less memory usage for media content decoding to be used. Additionally, using a selected inverse transform matrix corresponding to the size of the non-zero residual coefficient matrix can also result in fewer computational resources (e.g., CPU capacity) being used to decode the media content.

FIG. 1 illustrates an example of decoding media content with a reduced residual coefficient matrix for playback. As shown in FIG. 1, bitstream 105 can include a portion providing reduced residual coefficient matrix 115 and matrix metadata 110 of a High Efficiency Video Coding (HEVC/H.265) encoded media content. Reduced residual coefficient matrix 115 can include the non-zero coefficients of a residual coefficient matrix (e.g., the numbers in the matrix that have a non-zero value) that is transformed in the frequency domain with the application of a Discrete Cosine Transform (DCT) and quantization step, as previously discussed. Using the prior example, reduced residual coefficient matrix 115 is a 4×4 matrix (e.g., four columns and four rows) that includes the non-zero coefficients of a larger 8×8 matrix (e.g., eight columns and eight rows). As a result, matrix metadata 110 can indicate that reduced residual coefficient matrix 115 includes data representing a subset of a larger 8×8 matrix representing an 8×8 block of an image frame.

In FIG. 1, decoder 120 can receive bitstream 105 including reduced residual coefficient matrix 115 and matrix metadata 110. Using matrix metadata 110 and analyzing reduced residual coefficient matrix 115 to determine its size, decoder 120 can select an inverse transform matrix from a set of inverse transform matrices 125 that can be used to reverse the encoding process to reconstruct a block from an image frame of the media content for playback. That is, inverse transform matrices 125 indicates the matrix to be applied (e.g., multiplied) to reduced residual coefficient matrix 115 based on matrix metadata 110 and the analysis of reduced residual coefficient matrix 115 indicating the sizes of the parent matrix from which reduced residual coefficient matrix 115 was selected from and reduced residual coefficient matrix 115, respectively.

For example, the HEVC/H.265 standard specifies inverse transform matrices to be applied during the decoding process. However, a full-size inverse transform matrix might be too large for reduced residual coefficient matrix 115. If reduced residual coefficient matrix 115 is a 4×4 matrix of a larger 8×8 matrix, then the 8×8 inverse transform matrix would not be necessary to apply to the 4×4 reduced residual coefficient matrix 115. Scaling reduced residual coefficient matrix 115 to be the same size (e.g., by appending it with enough zero coefficients to recreate the larger 8×8 matrix it was part of) is also problematic as it can result in unnecessary computation resources being used to perform unnecessary calculations (e.g., calculations that would merely result in 0s from the appended zero coefficients). Moreover, scaling reduced residual coefficient matrix 115 would result in memory 130 (e.g., implemented within the random access memory (RAM) or video RAM of a viewer device) used by decoder 120 to increase, resulting in a decrease in the memory available for other applications of the viewer device.

Therefore, in FIG. 1, inverse transform matrices 125 can include inverse transform matrices for a 2×2 matrix of a larger 8×8 inverse transform matrix (e.g., the 2×2 matrix in the top-left corner of the larger 8×8 inverse transform matrix), 4×4 matrix of a larger 8×8 inverse transform matrix, an 8×8 inverse transform matrix, 2×2 matrix of a larger 16×16 inverse transform matrix, 4×4 matrix of a larger 16×16 inverse transform matrix, and so forth to be applied to a reduced residual coefficient matrix based on its corresponding matrix property metadata. As a result, decoder 120 can use matrix metadata 110 (e.g., indicating that reduced residual coefficient matrix 115 is from an 8×8 matrix) and determine the size of reduced residual coefficient matrix 115 (e.g., indicating that it is a 4×4 matrix) to select the appropriate matrix from inverse transform matrices 125 (e.g., a 4×4 inverse transform matrix that is a truncated version or a subset of the 8×8 inverse transform matrix). As such, decoder 130 can reconstruct the 8×8 block 135, which is a portion of a larger frame 140, from the smaller 4×4 reduced residual coefficient matrix 115. That is, the 4×4 reduced residual coefficient matrix 115 can have the selected modified 4×4 inverse transform matrix applied, or multiplied, to generate a 4×4 matrix with image data that provides the meaningful image content to reconstruct the 8×8 block 135. Since the generated 4×4 matrix with the image data is smaller than a full 8×8 matrix storing a large amount of zero valued residual coefficients, the amount of memory 130 used by decoder 120 dedicated to decoding can be reduced.

Different blocks, or portions, of frames can be decoded by selecting an appropriate modified inverse transform matrix from inverse transform matrices 125 to apply to a reduced residual coefficient matrix. For example, if bitstream 105 next provides an 8×8 reduced residual coefficient matrix and its corresponding matrix metadata indicates that it is from a larger 16×16 matrix, then decoder 120 can select a modified 8×8 matrix of a larger 16×16 inverse transform matrix to apply to the 8×8 reduced residual coefficient matrix to be able to recreate a 16×16 block (e.g., 16 pixels by 16 pixels) of frame 140. That is, a portion or subset of a parent inverse transform matrix (of a size of reduced residual coefficient matrix) can be selected as the inverse transform matrix to be applied to the reduced residual coefficient matrix, as discussed later herein.

Figure 2:
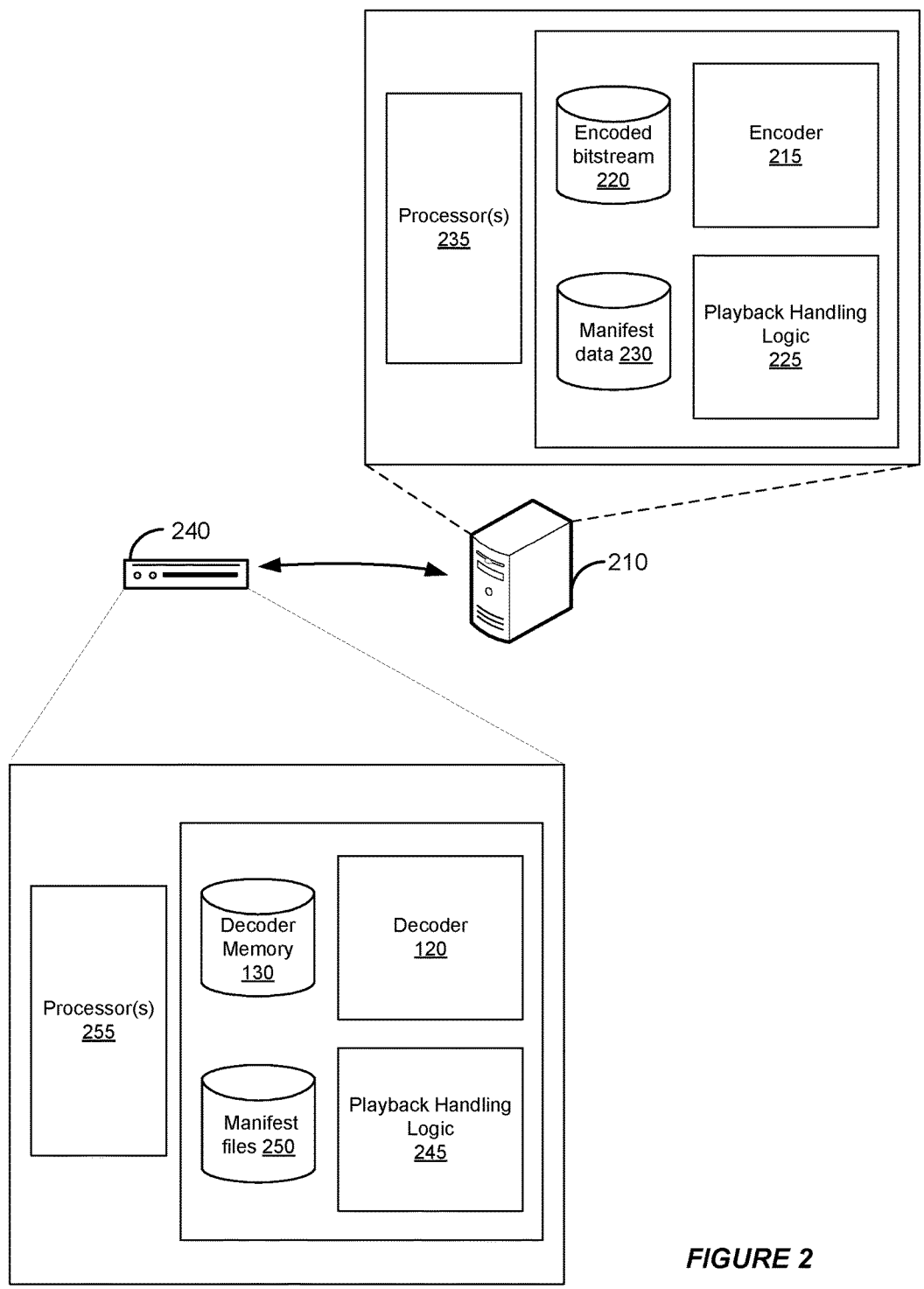
FIG. 2 illustrates an example of a computing environment for encoding and decoding media content with reduced residual coefficient matrices.

FIG. 2 illustrates an example of a computing environment for encoding and decoding media content with modified and reduced residual coefficient matrices. The computing environment of FIG. 2 includes media server 210 which can be used to encode and provide media content to viewer device 240. Viewer device 240 can decode the encoded media content for playback on a display screen.

Media server 210 can conform to any of a wide variety of architectures and its functionality may be implemented by a variety of servers. For example, one server might encode media content and the encoded media content might be provided to another server, for example, belonging to a content delivery network (CDN). As such, the functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer device 240), integrated into a separate app from another entity, implemented in an edge server or content server of a CDN, a server of an ISP, etc.

In FIG. 2, viewer device 240 is a video game console. However, related functionality may also be implemented within smartphones, laptops, set-top boxes, televisions, desktop computers, tablets, wearable devices, virtual or augmented reality headsets, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, media server 210 can include various types of logic used to implement encoder 215 to encode media content and store encoded media content in memory such as encoded bitstream 220, as well as playback handling logic 225 to provide requested manifest files from manifest data 230 to viewer device 240 so that viewer device 240 can request the encoded media content for playback. As a result, media server 210 can include one or more processors 235, memory, and other hardware components to encode media content and provide the encoded media content to viewer device 240. For example, processors 235 can execute stored instructions in memory of media server 210 to implement encoding techniques disclosed herein.

Viewer device 240 can also include various types of logic used to implement decoder 120 to decode the encoded media content received from media server 210 and store the decoded media content in decoder memory 130, as well as playback handling logic 245 to request manifest files and store the manifest files in manifest files 250, and request and store fragments of the encoded media content based on the manifest files. As a result, viewer device 240 can include one or more processors 235, memory, and other hardware components to request and decode the encoded media content provided by media server 210. For example, processors 255 can execute stored instructions in memory of viewer device 240 to implement decoding techniques disclosed herein.

Figure 3:
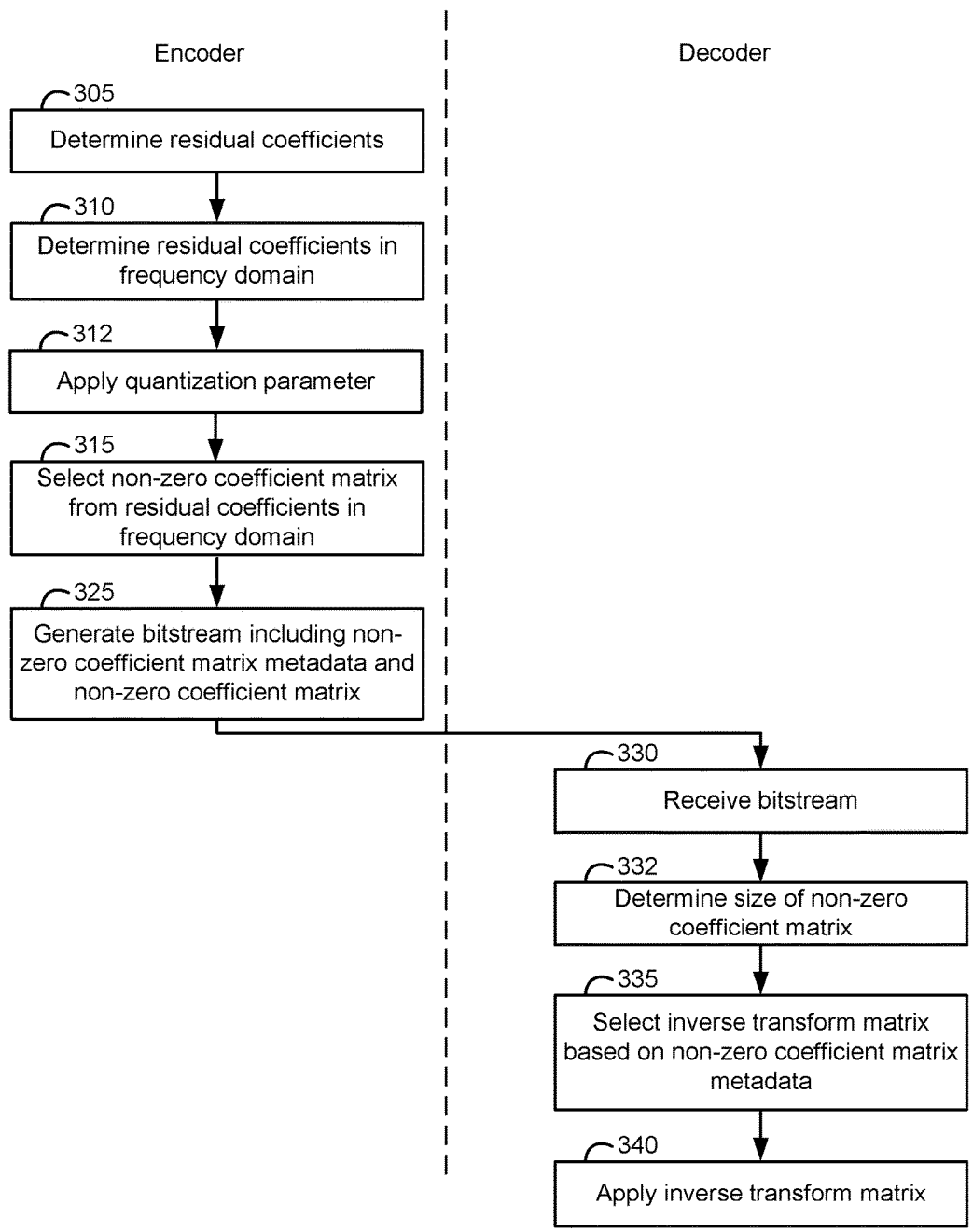
FIG. 3 is a flowchart illustrating an example of encoding and decoding media content with reduced residual coefficient matrices.

A specific implementation will now be described with reference to FIG. 1, the computing environment of FIG. 2, the flow diagram of FIG. 3, and the examples of FIGS. 4 and 5. In FIG. 3, media server 210 can encode media content by determining residual coefficients of a portion of the media content (305). In some implementations, such as with the HEVC/H.265 standard, this can include target frame 410 in FIG. 4 being segmented into a variety of block-like portions of different sizes. Each block-like portion of target frame 410 can be separately encoded.

In HEVC/H.265, the blocks, or portions, of a first frame of a sequence of frames can be encoded using an intra-picture prediction model (e.g., using spatial prediction within target frame 410). The portions of other frames of the sequence can be encoded using an inter-picture prediction model (e.g., using motion compensation between target frame 410 and reference frame 405) in reference to other frames in the sequence. Residual data representing the differences between a selected block and its corresponding block (e.g., in the reference frame) can be generated by the encoder. The residual data can be used by decoder 120 to reconstruct the block of target frame 410 using fewer bits.

Figure 4:
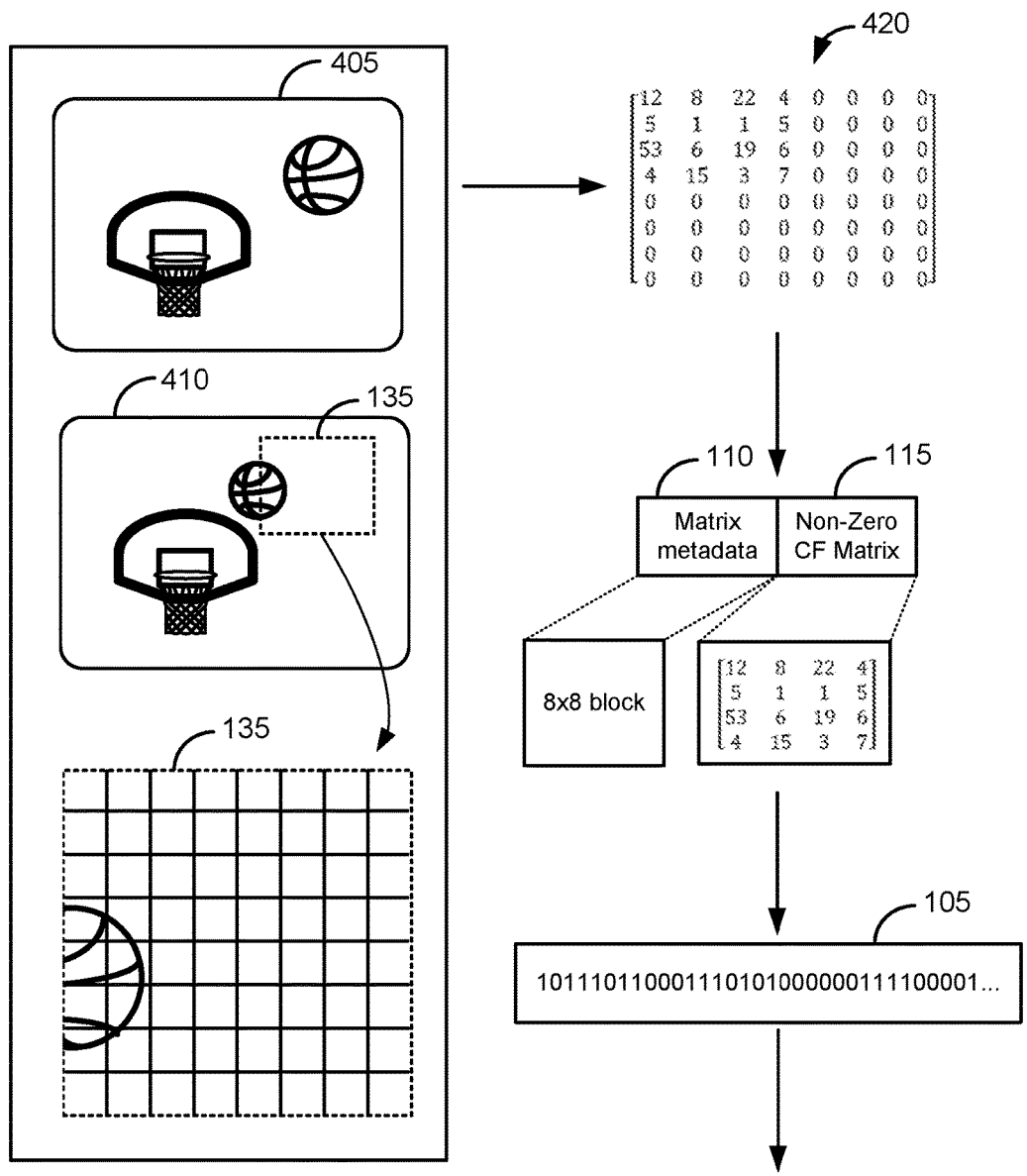
FIG. 4 illustrates an example of encoding media content with reduced residual coefficient matrices.

For example, in the simplified example of FIG. 4, block 135 of target frame 410 can be encoded by determining residual coefficients modeled in a matrix. The residual coefficients represent differences in image content between block 135 in target frame 410 to a corresponding block of a similar size in reference frame 405 (e.g., a frame that is played back before target frame 410). In the simplified example of FIG. 4, block 135 in FIG. 4 is an 8×8 block (e.g., 8 pixels by 8 pixels), and therefore, an 8×8 matrix corresponding to the size of block 135 can represent the residual coefficients for block 135. In some implementations, the residual coefficients can be further scaled, quantized, entropy coded, etc. depending upon the encoding scheme.

Next, the encoder can determine the residual coefficients in the frequency domain (310) and apply a quantization parameter (312) to scale the values of the residual coefficients in the frequency domain. For example, in FIG. 4, the 8×8 matrix representing the residual coefficients for block 135 can initially be in the spatial domain based on the positions of the pixels. By applying a Discrete Cosine Transform (DCT) and the quantization parameter to the 8×8 matrix representing the residual coefficients in the spatial domain, frequency domain residual coefficient matrix 420 can be generated. As depicted in FIG. 4, this results in a large number of zero coefficients and a few non-zero coefficients clustered within the top-left corner of frequency domain residual coefficient matrix 420. In the frequency domain, the top-left corner represents low frequency coefficients and the bottom-right corner represents high frequency coefficients. The middle regions within the lower-left and top-right corners can represent middle frequency coefficients.

In video compression, residual coefficients in the frequency domain are often concentrated within the top-left low frequency portion of frequency domain residual coefficient matrix 420. For example, in some scenarios, upwards of 80% of blocks of target frame 410 can have their residual coefficients concentrated within a 1×1, 2×2, 4×4, etc. top-left portion of a larger parent matrix, such as the 4×4 portion within the 8×8 frequency domain residual coefficient matrix 420 in FIG. 4. The non-zero residual coefficients represent the kept differences in the image content (or data) between the block 135 of target frame 410 to the corresponding block in reference frame 405. By contrast, the zero coefficients are relatively meaningless and could be removed or reduced in a compression scheme as they represent no differences in the image content between block 135 and the corresponding block in reference frame 405.

As a result, encoding the media content with only the non-zero coefficients can allow for fewer bits needed to reconstruct block 135 of target frame 410 by decoder 120. Thus, encoder 215 can select the non-zero coefficients from frequency domain residual coefficient matrix 420 (315) and generate metadata regarding the non-zero coefficients (320) to be provided in a bitstream for decoder 120 (325).

For example, in FIG. 4, reduced residual coefficient matrix 115 can be the non-zero coefficient portion of frequency domain residual coefficient matrix 420 that is selected by encoder 215 to provide in bitstream 105. In some implementations, reduced residual coefficient matrix 115 can be the smallest matrix within frequency domain residual coefficient matrix 420 that includes every non-zero residual coefficient. In some implementations, the matrix may be a square matrix (e.g., M×M) with its top-left corner corresponding to the top-left corner of frequency domain residual coefficient matrix 420, but in other implementations, the matrix may be rectangular (e.g., M×N, where M and N are different) in size. For example, in FIG. 4, reduced residual coefficient matrix 115 is the top-left 4×4 sub-matrix of the parent frequency domain residual coefficient matrix 420. In some implementations, some non-zero residual coefficients may not be included within reduced residual coefficient matrix 115, for example, residual coefficients outside of a threshold range, above a threshold number, below a threshold number, positive numbers, negative numbers, etc. can be excluded from reduced residual coefficient matrix 115.

Matrix metadata 110 can be syntax bits that are generated by encoder 215 based on reduced residual coefficient matrix 115 and frequency domain residual coefficient matrix 420. In FIG. 4, matrix metadata 110 indicates that reduced residual coefficient matrix 115 was selected from an 8×8 frequency domain residual coefficient matrix 420. Matrix metadata 110 can be included within bitstream 105 and bitstream 105 can be stored in encoded bitstream 220 of media server 210.

In some implementations, matrix metadata 110 can also indicate a position of reduced residual coefficient matrix 115 within its parent 8×8 frequency domain residual coefficient matrix 420 and the size of reduced residual coefficient matrix 115. For example, top-left corner of reduced residual coefficient matrix 115 can be shifted in columns or rows from the top-left corner of frequency domain residual coefficient matrix 420. As an example, matrix metadata 110 can indicate that reduced residual coefficient matrix 115 is a 4×4 matrix selected from the middle of 8×8 frequency domain residual coefficient matrix 420.

Viewer device 240 can request to play back the media content and media server 210 can provide bitstream 105 to viewer device 240 (330). However, in other implementations, bitstream 105 can be stored on viewer device 240 and be played back without requesting the media content from media server 210. Viewer device 240 can then decode bitstream 105 (as encoded by encoder 215 of media server 210) to play back the media content by determining a size of reduced residual coefficient matrix 115 (332) and selecting an inverse transform matrix based on the metadata indicating the size of the larger, parent residual coefficient matrix from which reduced residual coefficient matrix 115 was selected from and the size of the non-zero residual coefficient matrix (335). The inverse transform matrix can be applied to (e.g., multiplied with) the reduced residual coefficient matrix 115 to be able to recreate block 135 (340). That is, the 4×4 reduced residual coefficient matrix 115 can be used to recreate the 8×8 block 135.

Figure 5:
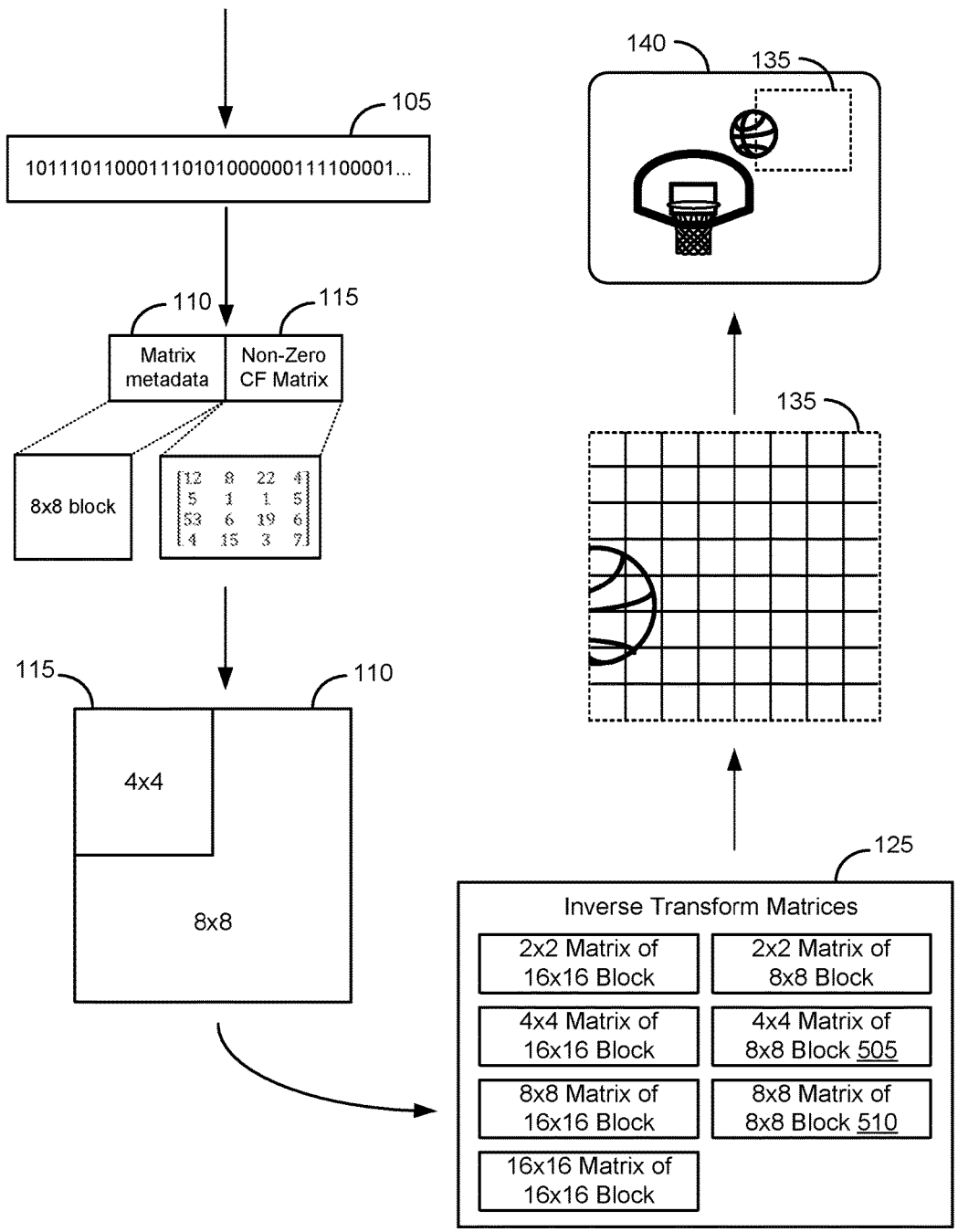
FIG. 5 illustrates an example of decoding media content with reduced residual coefficient matrices.

For example, in FIG. 5, bitstream 105 can be received by viewer device 240 and parsed by decoder 120 to receive matrix metadata 110 and reduced residual coefficient matrix 115. Reduced residual coefficient matrix 115 can be used by decoder 120 to reconstruct block 135 of target frame 410 by selecting an inverse transform matrix from inverse transform matrices 125 to apply to reduced residual coefficient matrix 115 based on matrix metadata 110. That is, the 4×4 reduced residual coefficient matrix 115 can be used to generate the 8×8 block 135 of target frame 410 for playback at viewer device 240.

Using the prior example, decoder 120 determines that reduced residual coefficient matrix 115 is a 4×4 matrix. For instance, decoder 120 can parse through reduced residual coefficient matrix 115 and determine the size of reduced residual coefficient matrix based on the location of the last coefficient (e.g., in the corners). If matrix metadata 110 indicates that reduced residual coefficient matrix 115 includes the non-zero coefficients from an 8×8 residual coefficient matrix that includes both zero and non-zero coefficients, then the 4×4 inverse transform matrix 505 (labeled as 4×4 matrix of 8×8 block) from inverse transform matrices 125 can be selected by decoder 125 and applied to reduced residual coefficient matrix 115. The 4×4 inverse transform matrix 505 itself can be a subset of the larger, parent 8×8 inverse transform matrix 510. For example, since reduced residual coefficient matrix 115 is the top-left 4×4 of the 8×8 frequency domain residual coefficient matrix 420 (as depicted in FIG. 4), then the top-left 4×4 of an 8×8 inverse transform matrix can be used. Likewise, the 2×2 inverse transform matrix for the 8×8 block can be a 2×2 inverse transform matrix that is the top-left 2×2 subset of the 4×4 matrix as well as the 8×8 matrix. By applying the selected inverse transform matrix to reduced residual coefficient matrix 115, block 135 of target frame 140 can be generated by decoder 120. As a result, the smaller 4×4 reduced residual coefficient matrix 115 can be used to generate the larger 8×8 block 135. The inverse transform matrices can also be M×M or M×N in size and can range from 1×1 or higher.

The result of the application of the selected inverse transform matrix to the reduced residual coefficient matrix can be stored in memory allocated to or associated with the decoder. Each portion can result in storing the result of an application of a selected inverse transform matrix, and therefore, several matrices representing decoded portions can be stored and then displayed as an image frame of the media content on a screen of the viewer device for playback.

Selecting an appropriately-sized inverse transform from inverse transform matrices 125 can result in reduced computational resources used by decoder 120 since unnecessary calculations can be avoided. Moreover, decoder 120 can use less memory to decode bitstream 105 since fewer bits are needed to store reduced residual coefficient matrix 115 (e.g., a 4×4 matrix) than frequency domain residual coefficient matrix 420 (e.g., an 8×8 matrix), as well as the result of applying the selected inverse transform matrix. Additionally, if other applications need to copy the residual coefficients to another memory then the memory bandwidth can also be reduced by using smaller matrices.

The amount of memory and computational resources used by decoder 120 can be reduced with other techniques. For example, when streaming media content from media server 210, viewer device 240 might use an adaptive bitrate streaming heuristic that requests specific fragments of media content at certain bitrates based on the CPU capacity and bandwidth available. Media server 210 can provide a manifest file including metadata that can be used by viewer device 240 to form requests for the fragments as well as play back those fragments.

In some implementations, the manifest data can indicate network abstraction layer (NAL) unit boundaries. In some video decoding standards, such as with HEVC, a byte or bit stream format includes a series of NAL units similar to packets with headers and payloads with corresponding data. The boundary of one NAL unit to another NAL unit can be indicated in a bitstream with a three-bit or byte start code prefix, for example "001." That is, when "001" occurs in the bitstream, that is to be interpreted as a boundary between NAL units. As a result, in some scenarios, decoder 120 might search for the "001" start code prefix within a bitstream to determine where new NAL units begin. However, searching for the "001" start code prefix can be computationally intensive as it can involve searching a large bitstream. Moreover, the start code prefixes might be in different locations because NAL units might be different sizes.

Figure 6:
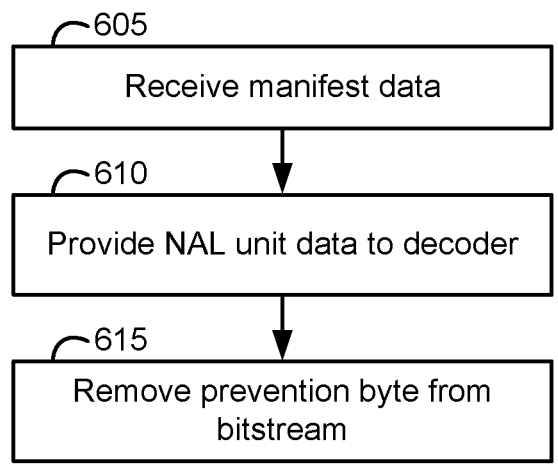
FIG. 6 is a flowchart illustrating an example of a decoder using network abstraction layer (NAL) unit metadata.

In some implementations, decoder 120 can obtain manifest data indicating the NAL unit boundaries from a video player of viewer device 240 that plays back the media content and requests the manifest file. FIG. 6 is a flowchart illustrating an example of a decoder using network abstraction layer (NAL) unit metadata. In FIG. 6, manifest data can be received by a video player (605) and the NAL unit boundaries data can be provided to decoder 120 (610). For example, the manifest data can indicate the NAL unit boundaries. As a result, decoder 120 can determine the boundaries between NAL units.

Additionally, decoder 120 can remove a prevention byte from the bitstream (615). For example, in some implementations, bitstream 705 might include a bit or byte sequence similar to the "001" start code prefix (that normally indicates a NAL unit boundary), but instead be actual header or payload data of the NAL unit. That is, the sequence that can indicate a start code prefix might be data unrelated to a start code prefix. As a result, when an encoder encodes media content into a bitstream, a prevention byte might be inserted into the bitstream so that decoder 120 does not improperly determine that a NAL unit boundary has occurred.

Figure 7:
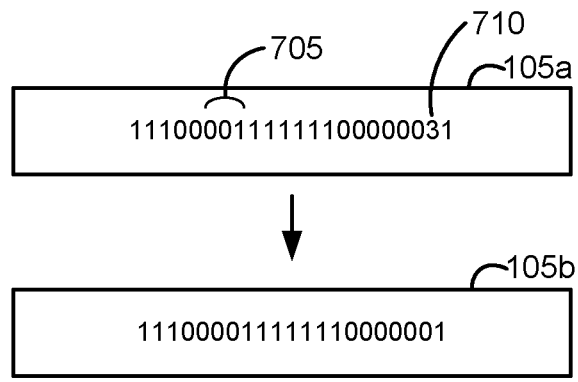
FIG. 7 illustrates an example of removing a NAL unit prevention byte from a bitstream.

FIG. 7 illustrates an example of removing a NAL unit prevention byte from a bitstream. In FIG. 7, bitstream 105 includes start code prefix 705 (i.e., a "001" in bitstream 105a) and prevention byte 710 (i.e., "3" within "0031" in bitstream 105a). Prevention byte 710 includes a "3" in in the middle of a "001" portion of bitstream 105a because it is not a NAL unit boundary, and therefore, an encoder has inserted the "3" such that decoder 120 does not recognize "001" without the prevention byte 710 as being a NAL unit boundary. In some implementations, decoder 120 can remove the "3" prevention byte 710 before generating residual data. Removing the prevention byte can result in reducing the amount of memory used to decode media content.

In some implementations, the amount of memory used by decoder 120 can also be reduced by storing fewer reference frames used to decode portions of a target frame. For example, in some scenarios, the current, target frame is stored for subsequent use as a reference frame. However, in some implementations, the target frame is not stored as a reference frame. As a result, if five frames are stored in some scenarios, including the target frame, then in some implementations only four of the five frames can be stored as references frames. That is, the target frame does not need to be stored as a reference frame, resulting in 1 less reference frame being stored, and therefore, decoder 120 using less memory for storing reference frames used to decode a target frame.

The techniques disclosed herein can be used in adaptive bitstream streaming, for example, when viewer device 240 in FIG. 2 requests fragments of media content from media server 210, as previously discussed. However, in other implementations, media content can already be encoded and stored and available for decoding on viewer device 240 without requesting media content to stream. In some implementations, all of the media content can be provided by media server 210 to viewer device 240 (i.e., downloaded rather than played back via adaptive bitrate streaming).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
   receiving, by an electronic device, media content data including a residual coefficient matrix instead of a parent matrix of the residual coefficient matrix, the residual coefficient matrix representing differences between a portion of an image frame of media content and one or more reference frames of the media content, the residual coefficient matrix including non-zero value residual coefficients of the parent matrix, and the media content data including residual coefficient matrix metadata indicating a size of the parent matrix;
   determining, by the electronic device, a size of the residual coefficient matrix, the size of the parent matrix being larger than the size of the residual coefficient matrix;
   selecting, by the electronic device, an inverse transform matrix based on the size of the residual coefficient matrix and the size of the parent matrix; and
   applying, by the electronic device, the inverse transform matrix to the residual coefficient matrix to decode the portion of the image frame of the media content.

2. The computer implemented method of claim 1, wherein the parent matrix includes the non-zero value residual coefficients and zero value residual coefficients.

3. The computer implemented method of claim 1, wherein a size of the inverse transform matrix and the size of the residual coefficient matrix are the same.

4. The computer implemented method of claim 1, wherein the residual coefficient matrix metadata also indicates a position of the residual coefficient matrix within the parent matrix.

5. A system, comprising:
   one or more processors and memory configured to:
   receive media content data indicating a residual coefficient matrix instead of a parent matrix of the residual coefficient matrix, the residual coefficient matrix corresponding to a portion of an image frame of media content, and the residual coefficient matrix including non-zero value residual coefficients of the parent matrix, the media content data also including residual coefficient matrix metadata indicating a size of the parent matrix, the size of the parent matrix being larger than a size of the residual coefficient matrix; and
   apply an inverse transform matrix to the residual coefficient matrix based on the size of the residual coefficient matrix and the size of the parent matrix.

6. The system of claim 5, wherein the parent matrix includes the non-zero value residual coefficients and zero value residual coefficients.

7. The system of claim 5, wherein a size of the inverse transform matrix and the size of the residual coefficient matrix are the same.

8. The system of claim 5, wherein the one or more processors and memory are further configured to:
   store a result of the application of the inverse transform matrix to the residual coefficient matrix in memory associated with a video decoder, the result corresponding to a portion of an image frame.

9. The system of claim 5, wherein the residual coefficient matrix metadata also indicates a position of the residual coefficient matrix within the parent matrix.

10. The system of claim 5, wherein the one or more processors and memory are further configured to:
    determine the size of the residual coefficient matrix.

11. The system of claim 7, wherein the inverse transform matrix is a portion of a parent inverse transform matrix.

12. The system of claim 11, wherein a size of the parent inverse transform matrix and the size of the parent matrix are the same, and the size of the inverse transform matrix is smaller than the size of the parent inverse transform matrix.

13. A computer program product comprising one or more non-transitory computer-readable media having computer instructions stored therein, the computer program instructions being configured such that, when executed by one or more computing devices, the computer program instructions cause the one or more computing devices to:

receive media content data indicating a residual coefficient matrix instead of a parent matrix of the residual coefficient matrix, the residual coefficient matrix corresponding to a portion of an image frame of media content, and the residual coefficient matrix including non-zero value residual coefficients of the parent matrix, the media content data also including residual coefficient matrix metadata indicating a size of the parent matrix, the size of the parent matrix being larger than a size of the residual coefficient matrix; and apply an inverse transform matrix to the residual coefficient matrix based on the size of the residual coefficient matrix and the size of the parent matrix.

14. The computer program product of claim 13, wherein the parent matrix includes the non-zero value residual coefficients and zero value residual coefficients.

15. The computer program product of claim 13, wherein the computer program instructions are further configured to cause the one or more computing devices to:

store a result of the application of the inverse transform matrix to the residual coefficient matrix in memory associated with a video decoder, the result corresponding to a portion of an image frame.

16. The computer program product of claim 13, wherein the residual coefficient matrix metadata also indicates a position of the residual coefficient matrix within the parent matrix.

17. The computer program product of claim 13, wherein the computer program instructions are further configured to cause the one or more computing devices to:

determine the size of the residual coefficient matrix.

18. The computer program product of claim 13, wherein a size of the inverse transform matrix and the size of the residual coefficient matrix are the same.

19. The computer program product of claim 18, wherein the inverse transform matrix is a portion of a parent inverse transform matrix.

20. The computer program product of claim 19, wherein a size of the parent inverse transform matrix and the size of the parent matrix are the same, and the size of the inverse transform matrix is smaller than the size of the parent inverse transform matrix.

\* \* \* \* \*